United States Patent
Diethelm et al.

(10) Patent No.: US 6,258,474 B1
(45) Date of Patent: Jul. 10, 2001

(54) FUEL CELL MODULE WITH AN INTEGRATED ADDITIONAL HEATER

(75) Inventors: Roland Diethelm, Bauma; Thomas Gamper, Trasadingen, both of (CH)

(73) Assignee: Sulzer Hexis AG, Winterthur (CH)

( * ) Notice: Subject to any disclaimer, the term of this patent is extended or adjusted under 35 U.S.C. 154(b) by 0 days.

(21) Appl. No.: 09/198,649

(22) Filed: Nov. 24, 1998

(30) Foreign Application Priority Data

Nov. 25, 1997 (EP) .................................................. 97810906

(51) Int. Cl.⁷ .............................. H01M 8/04; H01M 8/24
(52) U.S. Cl. ................................................................ 429/26
(58) Field of Search ........................................ 429/26, 34

(56) References Cited

U.S. PATENT DOCUMENTS

| | | |
|---|---|---|
| 3,146,131 | 8/1964 | Linden . |
| 3,485,676 | 12/1969 | Hodgson . |
| 3,718,506 | 2/1973 | Fischer . |
| 4,683,177 | 7/1987 | Kinoshita ............................ 429/26 |
| 5,942,344 * | 8/1999 | Lehmeier et al. ................... 429/13 |
| 5,998,053 * | 12/1999 | Diethelm ............................ 429/14 |

FOREIGN PATENT DOCUMENTS

| | | |
|---|---|---|
| 4217892A1 | 12/1992 | (DE) . |
| 19523973C1 | 12/1996 | (DE) . |
| 0654838A1 | 5/1995 | (EP) . |
| 0780917A1 | 6/1997 | (EP) . |
| 0818840A1 | 1/1998 | (EP) . |
| 1.149.229 | 12/1957 | (FR) . |
| WO 94/18712 | 8/1994 | (WO) . |

OTHER PUBLICATIONS

Patent Abstracts of Japan, vol. 012, No. 239 (E–630),Jul. 7, 1988 & JP63029445 A(Mitsubishi Heavy Ind. Ltd.), Feb. 8, 1988, Abstract.

* cited by examiner

Primary Examiner—Stephen Kalafut
Assistant Examiner—Jonathan Crepeau
(74) Attorney, Agent, or Firm—Townsend and Townsend and Crew LLP

(57) ABSTRACT

The fuel cell module contains an integrated additional heater for a start-up operation and comprises the following components. Planar fuel cells are connected in series and form a cylindrical stack at the lateral surface of which air infeed points of the cells are located. A jacket is arranged about the cell stack and is formed as a dynamic heat insulation in a manner radially permeable to air. Furthermore, a space between the cell stack and the jacket is provided for an afterburning of gas leaving the cell and for conducting off exhaust gases. Heat sources of the additional heater are arranged at the inner surface of the jacket. During the start-up operation, the heat given off by the additional heater is at least partially introduced into the fuel cells by a radial air flow.

19 Claims, 3 Drawing Sheets

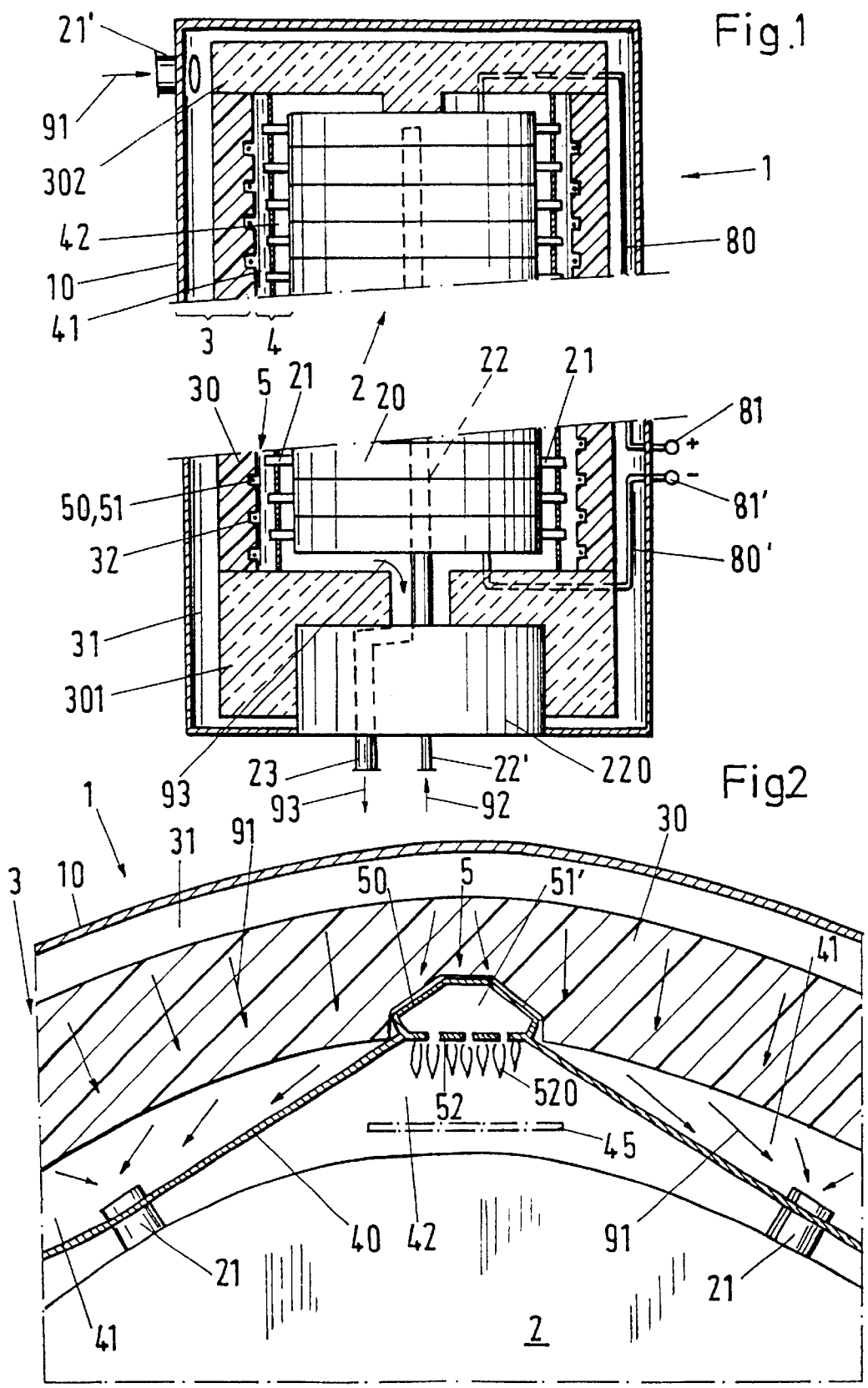

FUEL CELL MODULE WITH AN INTEGRATED ADDITIONAL HEATER

BACKGROUND OF THE INVENTION

The invention relates to a fuel cell module with an integrated additional heater and to a plant with a fuel cell module of this kind.

Apparatuses with fuel cells which contain integrated additional heaters by means of which a preformer is heated up to operating temperature in each case when putting the apparatus into operation are known from the patent specifications EP-A 0 654 838 and EP-A 0 780 917. The later specification describes a further development of the apparatus disclosed in the earlier specification. In this further development the additional heater has two further functions: a) heating up the air by means of which the cells are preheated when being put into operation; b) production of additional heat for heating purposes during the operation of the apparatus, with the fuel cells being used for the generation of electrical energy as well as of heat for heating purposes.

SUMMARY OF THE INVENTION

The object of the invention is to provide a further apparatus with fuel cells and an integrated additional heater which is particularly suitable as a module for plants, which can be assembled from different units in accordance with the requirements. In this situation these plants should be provided for the simultaneous generation of electrical energy and heat for heating purposes, and a variable requirement of heat for heating purposes is to be covered by separate burners which in each case are built into the plant as an additional unit in addition to the fuel cell module.

The fuel cell module contains an integrated additional heater for a start-up operation and comprises the following components. Planar fuel cells are connected in series and form a cylindrical stack, at the side surface of air infeed points of the cells are located. A jacket which is arranged about this cell stack, which is made radially permeable to air and which is formed as a dynamic heat insulator. Furthermore, a space between the cell stack and the jacket, is provided for an afterburning of gas leaving the cell and for conducting off exhaust gases. Heat sources of the additional heater are arranged at the inner surface of the jacket. During the start-up operation the heat given off by the additional heater is at least partially introduced into the fuel cells by a radial air current.

In this fuel cell module it is further provided only that the heat required for the start-up operation is delivered by the integrated additional heater. It is possible, as in the previously known apparatuses, to supply the heat required for the heating up by means of a gas combustion. If a connection to the electric power mains is available, which is generally the case, it can be practical for the additional heater to be formed as an electric heater.

BRIEF DESCRIPTION OF THE DRAWINGS

FIG. 1 shows a fuel cell module in accordance with the invention with an additional electric heater;

FIG. 2 shows details of a module in accordance with the invention with an additional heater which burns gas;

DESCRIPTION OF THE SPECIFIC EMBODIMENTS

Figure 3:
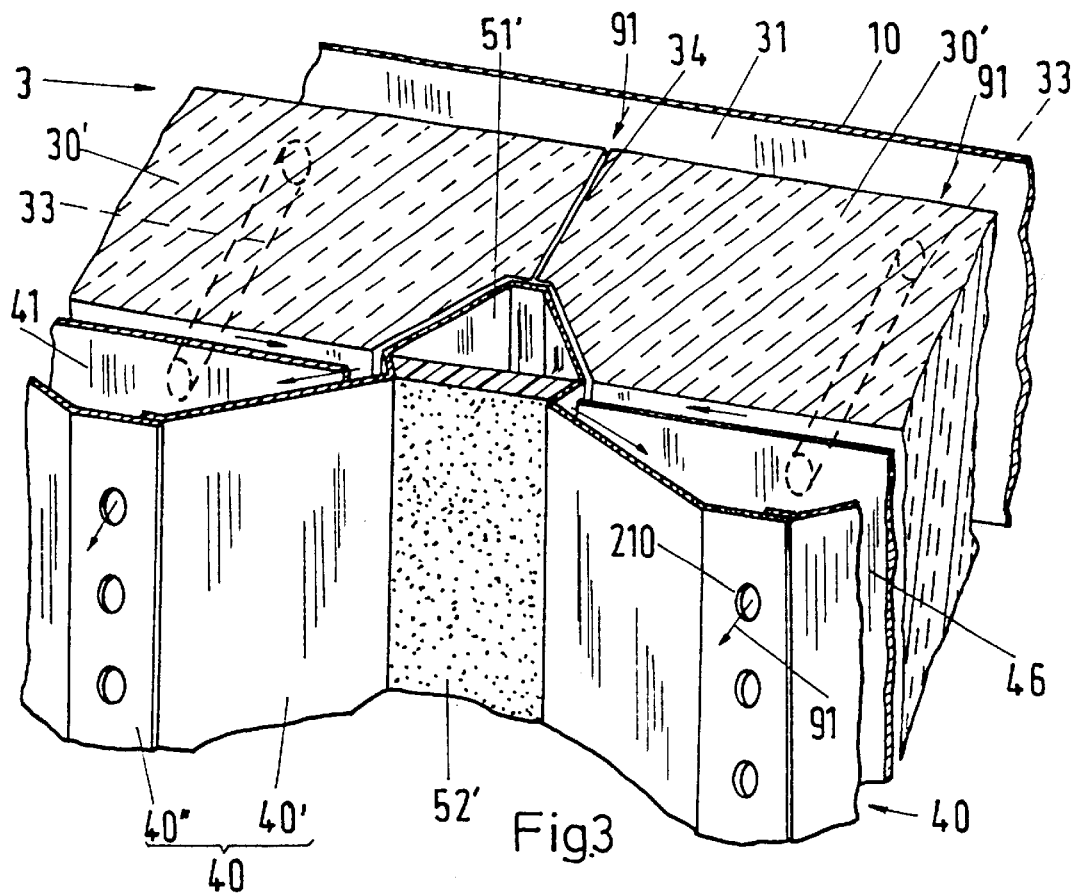
FIG. 3 shows corresponding details for a further exemplary embodiment, in an oblique view.

The fuel cell module 1 in FIG. 1 contains planar fuel cells 20 which are connected in series and form a stack 2, at the lateral surfaces of which air infeed points 21 of the cells 20 are located. A jacket 3 is arranged about the cell stack 2 and is permeable to air in the radial direction, and indeed in such a manner that it acts as a dynamic heat insulation. Heat which radiates to the outside from the hot surface of the cell stack 2 during operation is, after absorption in a structure 30 of the jacket 3, which consists of an open pored material, transferred to an air current flowing inwards and thus transported back into the cell stack 2.

In a space 4 between the cell stack 2 and the jacket 3, gas which has not been completely used up in the electrochemical reaction is burned during operation. This gas leaves the cells together with exhaust gases and parallel to the outflowing surplus air and enters an afterburner chamber 42, which is separated from an air space 41 by a wall 40. From the afterburner chamber 42 the exhaust gas 93, which now also contains the combustion products of the afterburning, is conducted into a preformer 220 where it gives off the process heat required for a reforming of fresh gas 92. The gas 92, which is supplied through the inlet connectors 22' and contains the reactive substances carbon monoxide and hydrogen after the reforming, is distributed into the fuel cells 20 via a central passage 22. The partially cooled exhaust gas 93 finally leaves the module 1 via an outlet connector 23. The heat contained in the exhaust gas 93 can now still be used to cover a heating requirement.

An outer wall 10 of the module 1 forms the outer closing off of the jacket 3. Air 91 is fed in via a connector 21' into a cavity 31 between the wall 10 and the heat insulating structure 30 and distributed there so that it can flow in uniformly over the entire surface of the structure 30 radially to the cell stack 2. Beneath the cell stack 2 as well as above it are arranged heat insulators 301 and 302 respectively which are not permeable to air and thus do not act as dynamic heat insulators.

The outer wall 10 can be executed as a heat insulator in the form of an evacuated cavity. The supplied air 91 is then advantageously introduced preheated into the space 31 between the outer wall 10 and the structure 30. A preheating to for example 400° C. can be carried out with the hot exhaust gas 93. Other embodiments of the outer wall 10 and the sleeve 3 are however also conceivable in which a preheating of the air 91 is advantageously provided (for which cf. the architecture of a fuel cell module disclosed in EP-A 0 814 526.

An additional heater 5 comprises linearly formed heat sources 50, namely electric heating wires 51 which are laid in uniformly into grooves 32 of the heat insulator structure 30 at the inner surface of the jacket 3. The heat given off by the heating wires 51 is partially transported into the fuel cells by the radial air flow. A further portion of the heat for heating purposes is transferred to the partition wall 40 by the radiation and from there to the surfaces of the cells 20. The heating wires 51 can for example be extended, i.e. bent in accordance with the curvature of the groove 32; but they can also have a helical form. The heating wires 51 can also have another orientation, for example in the direction of the stack axis.

The electrical energy produced in the fuel cells 20 can be extracted at two poles 81, 81', which are connected to the cell stack 2 via lines 80, 80'.

The heat sources 50 of the additional heater 5 can also be formed by passages 51' of a gas heater. FIG. 2 shows, in a sectionally illustrated cross-section through the module 1, a passage 51' of this kind, which is arranged in the axial direction, i.e. perpendicular to the plane of the drawing. A gas/air mixture is supplied via the passage 51' and burned at perforated side walls 52 in the form of open flames 520.

In order that the flame 520 does not produce too high a temperature at the cell stack 2, its direct radiation can be screened off with a plate 45, which is indicated in FIG. 2 by a chain-dotted line.

The combustion chamber 42 of the additional heater 5 is also the chamber for the afterburning of the gas leaving the cells during operation. A partition wall 40 between the chambers 41 and the afterburner chamber 42 is executed in such a manner that it forms the elements of the additional heater 5. The chambers 41 are executed as air conduction chambers in which the air 91 which flows through the structure 30 is led to air infeed points 21. The afterburner chamber 42 widens inwardly, whereas the air conduction chambers 41 narrow correspondingly. The inflowing air 91 is first preheated in the porous structure 30 of the heat insulating jacket 3 and then heated up further at the hot wall 40. During a putting into operation, heat is introduced into the cell stack 2 by the heated air and the cells 20 are therewith heated up to the required operating temperature. The air then enters into the combustion chamber 42 and flows from there together with the exhaust gases of the additional heater 5 into the prereformer 220 (see FIG. 1), which is likewise heated up to operating temperature by this gas mixture.

The oblique illustration of FIG. 3 shows a variant of the additional gas heater of FIG. 2. The heat insulator of the jacket 3 is composed here of elements 30' which are manufactured of a material impermeable to air. The radial supply of air 91 takes place via a large number of passages 33 and via slits 34 at the points of contact between adjacent elements 30'. (The element 30' can also be formed out of a closed cylinder ring without radial slits 34, which has only passages 33.) Sheet metal lamina 46 are arranged in the air chamber 41 perpendicular to the radial passages 33 and represent, on the one hand, a deflection baffle for the inflowing air 91 and, on the other hand, a screening off against the heat radiated to the outside from the wall 40. This arrangement with the elements 30' and screening lamina 46 also has the effect of a dynamic heat insulator.

Instead of a perforated side wall, the passages 51 for the gas/air mixture have a wall 52' which is manufactured of an open pored material. The wall 40 is assembled from a plurality of pieces 40', 40". Only openings 210 for tubelets for the air infeed points 21 (see FIG. 2) are shown.

Figure 4:
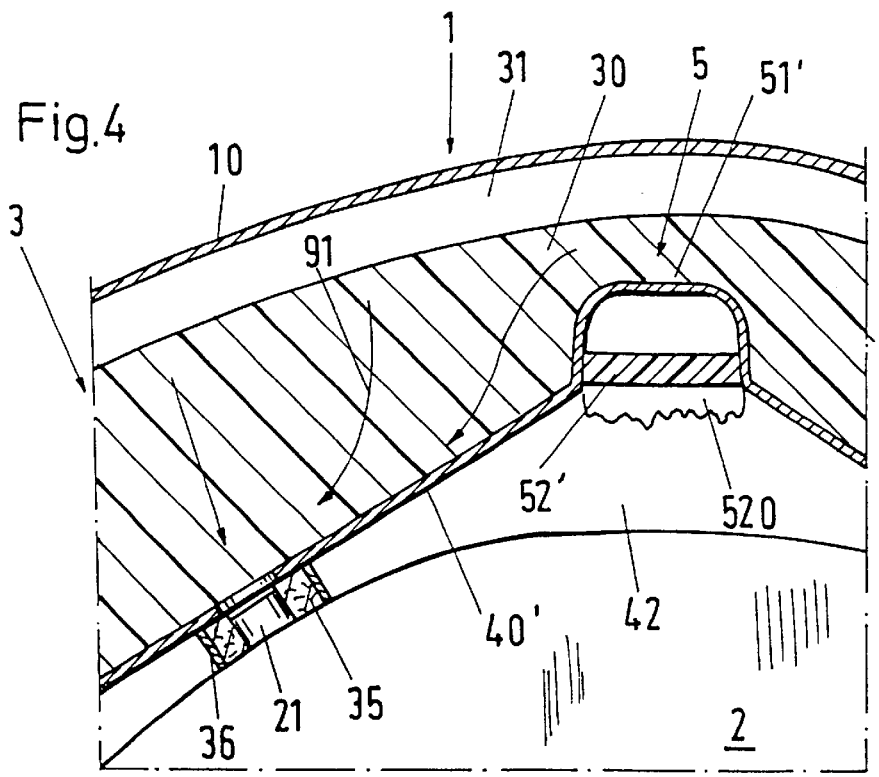
FIG. 4 show a third variant of the additional gas heater.

The exemplary embodiment of FIG. 4 is a further development of that illustrated in FIG. 2. It differs essentially in that the metallic wall 40 is replaced by a wall 40' of ceramic material. This variant can be manufactured relatively simply in that the open pored ceramic structure 30 is suitably formed, namely in such a manner that the air chamber 41 is filled by the structure 30 and in that the pores on the inner surface of the structure 30 are closed by ceramic particles—applied as a slurry and then burned in. A sealing cylinder ring 35 of ceramic felt is arranged during the connection to the air infeed point 21, and indeed advantageously in a mount 36 in the form of a metallic ring. The inner wall of the passage 51' is also formed of the coating with a ceramic material. A wall 52' of an open pored material is provided for the combustion of the supplied heating means (flame 520) as in the example of FIG. 3.

Figure 5:
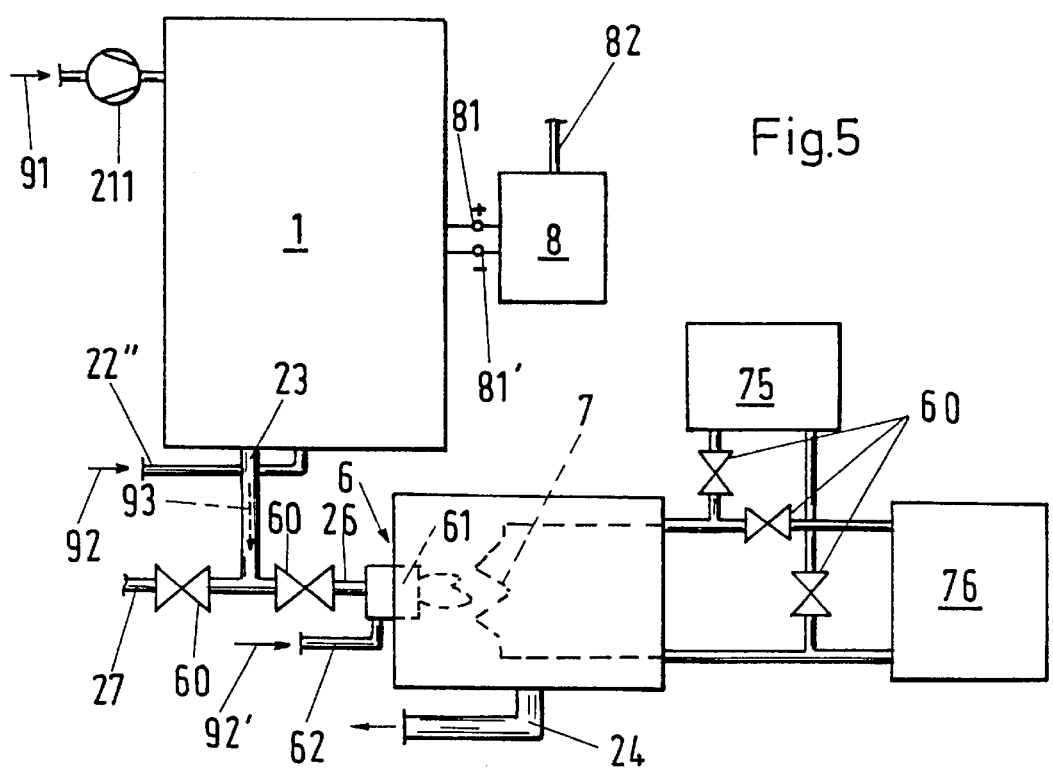
FIG. 5 shows a schematic representation of a plant which contains the module in accordance with the invention.

A plant 9 for the simultaneous generation of electrical energy and of heat for heating purposes which comprises a fuel cell module 1 in accordance with the invention is shown in FIG. 5. Further components of the plant 9 are as follows. An apparatus 8 is connected to the electric poles 81 and 81' of the module 1, by means of which the direct current generated can be converted to alternating current and which is connected to an electric power mains via a line 82. An additional heating device 6 with a burner 61 and a heat exchanger system 7 for an energy output to a heat transport medium are provided. The heat can be given off to a utility water heater 75 and/or to a room heating system 76. The heating device 6 is connected to the exhaust gas connectors 23 of the module 1. Air 91 is fed into the module 1 with a blower 211. The supply of gas 92 and 92' is done via a line 22" into the module 1 and via a line 62 into the burner 61 respectively. Exhaust gases which, on the one hand, stem from the fuel cells 20 and which, on the other hand, arise in the burner 61 are conducted via a line 24 into a non-illustrated chimney.

An exhaust gas line 26 leading from the module 1 to the heating device 6 is connected to an air infeed point of the burner 61. The exhaust gas line branches when connecting to the connectors 23 and ahead of the air infeed point of the burner 61. A second branch 27 of the exhaust gas line leads for example to a separate heat exchanger (not shown), which can be a part of the heat exchanger system 7. The burner 61 heats a heat exchanger of the system 7. A variety of possible uses of the plant 9 can be realized using diverse blocking members 60. Various switching possibilities which can also be realized with the plant 9 are described in the European patent specification No. 96810448.9.

The plant 9 can also be designed in such a manner that petroleum is burned in the burner 61 instead of gas 92'.

Analogously, the use of a liquid substance for the fuel of the fuel cell module 1 in accordance with the invention can also be provided where appropriate. This is possible when the prereformer 220 (FIG. 1) is designed in such a manner that the liquid fuel is—simultaneously or in two successive steps of the method—brought to the gaseous state and reformed.

If the need for heat for heating purposes is low, merely a heat exchanger system 7 can be provided instead of the heating device 6 with the burner 61.

What is claimed is:

1. A fuel cell module with an integrated additional heater for a start-up operation, the fuel cell module comprising:
    a plurality of fuel cells connected in series and forming a cell stack at a lateral surface of which air infeed ports of the fuel cells are located;
    a jacket arranged about the cell stack and forming a dynamic heat insulation in a manner radially permeable to air, the jacket being spaced from the cell stack by a space for an afterburning of gas leaving the cells and for leading away exhaust gases; and
    an additional heater including heat sources arranged at an inner surface of the jacket, the heat sources generating heat which is introduced at least partially into the fuel cells by a radial air flow, the heat sources comprising electrical heating wires.

2. The fuel cell module of claim 1 wherein the electrical heating wires are arranged in a helical shape or an extended shape.

3. The fuel cell module of claim 1 further comprising partition walls separating the cell stack, and combustion chambers in the space for the afterburning of gas from the air infeed ports and associated air conduction chambers.

4. The fuel cell module of claim 3 wherein the combustion chambers widen inwardly and the air conduction chambers narrow accordingly.

5. The fuel cell module of claim 1 wherein the heating wires of the additional heater are arranged in grooves of the inner surface of the jacket.

6. The fuel cell module of claim 1 wherein the jacket comprises permeable parts, at least some of which are formed of an open pored material.

7. The fuel cell module of claim 6 further comprising partition walls separating the cell stack and combustion chambers in the space for the afterburning of gas from the open pored material of the permeable parts of the jacket.

8. The fuel cell module of claim 1 wherein the jacket comprises radial passages for at least a portion of the radial air flow into the fuel cells.

9. A fuel cell module with an integrated additional heater for a start-up operation, the fuel cell module comprising:
- a plurality of fuel cells connected in series and forming a cell stack at a lateral surface of which air infeed ports of the fuel cells are located;
- a jacket arranged about the cell stack and forming a dynamic heat insulation in a manner radially permeable to air, the jacket being spaced from the cell stack by a space for an afterburning of gas leaving the cells and for leading away exhaust gases; and
- an additional heater including heat sources arranged at an inner surface of the jacket, the heat sources generating heat which is introduced at least partially into the fuel cells by a radial air flow, the heat sources comprising passages for receiving infeed of a gas/air mixture, the passages including perforated or open pored side walls for combustion of the gas/air mixture.

10. The fuel cell module of claim 9 wherein the passages of the additional heater are arranged in grooves of the inner surface of the jacket.

11. The fuel cell module of claim 9 further comprising partition walls separating the cell stack and combustion chambers in the space for the afterburning of gas from the air infeed ports and associated air conduction chambers.

12. The fuel cell module of claim 11 wherein the combustion chambers widen inwardly and the air conduction chambers narrow accordingly.

13. A plant comprising the fuel cell module of claim 9 for simultaneous generation of electrical energy and of heat for heating purposes, the plant further comprising:
- an apparatus connected to electrical poles of the cell stack for converting direct current generated by the cell stack to alternating current; and
- an additional heating device including a burner and a heat exchanger system for transferring energy to a heat transport medium, the heat exchanger system being in active connection with the burner and with an exhaust gas flow from the fuel cell module.

14. The plant of claim 13 further comprising an exhaust gas line leading from the fuel cell module to the additional heating device, the exhaust gas line being connected to an air infeed port of the burner of the additional heating device.

15. The plant of claim 14 wherein the exhaust gas line branches off ahead of the air infeed port of the burner, the exhaust gas line including a first branch connected to the air infeed port of the burner and a second branch leading to a separate heat exchanger.

16. A plant comprising the fuel cell module of claim 9 for simultaneous generation of electrical energy and of heat for heating purposes, the plant further comprising:
- an apparatus connected to electrical poles of the cell stack for converting direct current generated by the cell stack to alternating current; and
- a heat exchanger system connected with an exhaust gas flow from the fuel cell module.

17. A fuel cell module with an integrated additional heater for a start-up operation, the fuel cell module comprising:
- a plurality of fuel cells connected in series and forming a cell stack at a lateral surface of which air infeed ports of the fuel cells are located;
- a jacket arranged about the cell stack and forming a dynamic heat insulation in a manner radially permeable to air, the jacket being spaced from the cell stack by a space for an afterburning of gas leaving the cells and for leading away exhaust gases; and
- an additional heater including heat sources arranged in grooves at an inner surface of the jacket, the heat sources generating heat which is introduced at least partially into the fuel cells by a radial air flow.

18. The fuel cell module of claim 17 wherein the heat sources comprise electrical heating wires.

19. The fuel cell module of claim 17 wherein the heat sources comprise passages for receiving infeed of a gas/air mixture.

* * * * *